United States Patent [19]

Iwanaga et al.

[11] Patent Number: 4,951,274
[45] Date of Patent: Aug. 21, 1990

[54] MAGNETO-OPTICAL HEAD CAPABLE OF SEPARATING BEAMS FOR READING RECORDED INFORMATION AND SERVO INFORMATION BY USE OF ONE OPTICAL ELEMENT

[75] Inventors: Toshiaki Iwanaga; Yoshinori Sasaki; Shigeru Shimonou, all of Tokyo, Japan

[73] Assignee: NEC Corporation, Tokyo, Japan

[21] Appl. No.: 148,310

[22] Filed: Jan. 25, 1988

[30] Foreign Application Priority Data

| Jan. 23, 1987 | [JP] | Japan | 62-14905 |
| Jan. 29, 1987 | [JP] | Japan | 62-19855 |
| Jan. 29, 1987 | [JP] | Japan | 62-19856 |
| Apr. 15, 1987 | [JP] | Japan | 62-93677 |

[51] Int. Cl.$^5$ .................. G11B 7/09; G11B 7/13
[52] U.S. Cl. .................. 369/44.11; 369/13; 369/110; 369/112; 360/114
[58] Field of Search .................. 369/44–46, 369/13, 110, 112, 122; 360/114; 350/6.2, 375, 376, 378, 401

[56] References Cited

U.S. PATENT DOCUMENTS

| 4,103,988 | 8/1978 | Desormiere et al. | 350/378 X |
| 4,344,164 | 8/1982 | Bricot et al. | 369/110 X |
| 4,512,004 | 4/1985 | Nonaka | 369/45 |
| 4,558,440 | 12/1985 | Tomita | 369/13 |
| 4,573,149 | 2/1986 | Deguchi et al. | 369/13 |
| 4,624,526 | 11/1986 | Tsukai et al. | 369/112 X |
| 4,638,471 | 1/1987 | van Rosmalen | 369/46 |
| 4,771,414 | 9/1988 | Yoshimatsu | 369/13 X |
| 4,773,053 | 9/1988 | Gottfried | 369/13 X |
| 4,785,438 | 11/1988 | Mizunoe | 369/13 |
| 4,817,074 | 3/1989 | Yamanaka | 369/46 |
| 4,837,758 | 6/1989 | Motoyama et al. | 369/13 |

*Primary Examiner*—Alan Faber
*Assistant Examiner*—W. R. Young
*Attorney, Agent, or Firm*—Sughrue, Mion, Zinn, Macpeak & Seas

[57] ABSTRACT

A magneto-optical head for reading information from a recording medium, the head having a laser-based optical system that comprises two light paths, a first path from the source to and continuing through or reflecting from medium and a second path in a different direction which directs light from the medium to a detector. The second path includes a dual prism multiplying element (Wollaston prism) for dividing the reflected beam into three distinctly oriented beams, and a multi division photodetector for detecting a servo signal by the astigmatism method and an information signal by a differential polarization method.

14 Claims, 4 Drawing Sheets

MAGNETO-OPTICAL HEAD CAPABLE OF SEPARATING BEAMS FOR READING RECORDED INFORMATION AND SERVO INFORMATION BY USE OF ONE OPTICAL ELEMENT

BACKGROUND OF THE INVENTION

The present invention relates to a magneto-optical head and, more particularly, to a magneto-optical head for magneto-optically reading information from a magneto-optical recording medium.

A conventional magneto-optical head requires first, second and third optical systems, as described in the Japanese Patent Disclosure No. 233,448/1986. The first optical system is provided for irradiating a laser beam to a magneto-optical recording medium. The second optical system for reading the information detects changes in polarization of a reflected or transmitted beam from the recording medium. The third optical system for obtaining servo error signals from the reflected or transmitted beam detects changes in a luminous energy of the reflected or transmitted beam. In this structure, the reflected or transmitted beam from the recording medium is divided into two beams by a beam splitter consisting of a half mirror or the like. One of the split beams is led to a polarization analysing device, such as a polarized beam splitter and a light detecting element in order to read the recorded information. The other is led to an optical device for detecting a focus error signal, a track error signal and the luminous energy of the reflected or transmitted beam, none of which is subjected to the change of the polarization.

The above-described conventional magneto-optical head has a disadvantage of a complex and massive structure, which makes it difficult to reduce the size and cost of the magneto-optical head on account of an individual arrangement of the second and third optical systems.

SUMMARY OF THE INVENTION

An object of the present invention is, therefore, to provide a magneto-optical head with the size and weight reduced.

Another object of the present invention is to provide a magneto-optical head having an optical system capable of utilizing energy of a laser beam with high efficiency.

A magneto-optical head according to the invention comprises: a light source for generating a beam; a first optical system for focusing the beam on a surface of a magneto-optical recording medium; a beam splitter located on a first optical-path of a reflection or transmission beam reflected or transmitted from the magneto-optical recording medium for changing a direction of the first optical-path so as to form a second optical-path; a second optical system located on the second optical-path for dividing the reflection or transmission beam into a first beam having a first beam axis directed substantially parallel to the second optical-path and second and third beams having second and third beam axes, respectively, the second and third beam axes having a predetermined separating angle with respect to the second optical-path; and a multi-division photodetector for detecting a servo signal and an information signal from the first, second and third beams.

The present invention enables a magneto-optical head to be a simple structure and to be small in size because the separation of the reflection or transmission beam into the first, second and third beams can be achieved by one element. The present invention further permits efficient utilization of the reflection or transmission beam energy and thereby allows reduction of a load of the light source. Accordingly, the extra optical power is not required in a recording operation even when the speed of the magneto-optical disk revolution is higher than the conventional one. As a result, the speed of the disk revolution can be increased to raise the velocity of data transfer. At the same time, the access time of the magneto-optical disk drive itself can be shortened. On the other hand, since only one photodetector is required, the time and labor spent for adjustment of the photodetector can also be significantly shortened and reduced.

BRIEF DESCRIPTION OF THE DRAWINGS

In the drawings, the same reference numerals represent respectively the same structural elements.

DESCRIPTION OF THE PREFERRED EMBODIMENTS

To make the structural features of the invention more apparent, an optical head and a magneto-optical head of a prior art will be described first.

Verious methods have been proposed for focus error detection, which include a knife-edge method, an astigmatism method and a critical angle method. Specifically, the astigmatism method will be described below.

Figure 1:
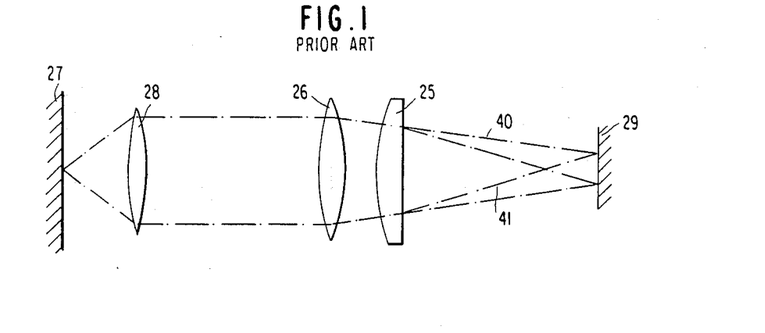
FIG. 1 and FIGS. 2(a) to 2(c) are diagrams illustrating the principle of the astigmatism method used in a prior art.

Referring to FIG. 1, an optical or magneto-optical head using the astigmatism method consists of a cylindrical lens 25 and a spherical lens 26. In the figure, reference numerals 40 and 41 respectively represent a light beam in the direction of the spherical lens 26 and one in the direction of the synthetic of the cylindrical lens 25 and the spherical lens 26.

Figure 2A:
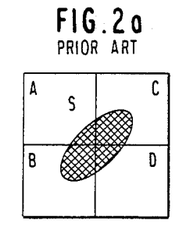
Figure 2B:
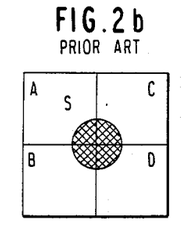
Figure 2C:
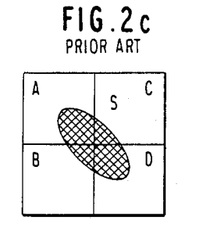

According to this method, due to the relative distance between a surface of an optical or magneto-optical disk 27 and a focal position of an objective lens 28, the shape of the beam S varies on a surface of a photodetector 29 as illustrated in FIGS. 2(a), 2(b) and 2(c) which respectively show a case in which the objective lens 28 is too close to the disk surface, one in which the beam S is in focus, and one in which the objective lens 28 is too far from the disk surface. Assuming that the outputs of individual divisions of the photodetector 29 are represented by A, B, C and D, the photodetector 29 can detect a focus error signal by calculating (A+D)−(B+C). At the same time, by figuring out (A+B)−(C+D), a diffracted beam from an optical disk with a guide groove can be measured to detect a track error signal. Of course, the axial line of the column of the cylindrical lens 25 is so arranged as to form a 45° angle with respect to the tracking direction. Thus, this method makes it possible for a single photodetector to detect a servo signal including the focus and track error signals in order to position the spot of the light beam on the surface of the disk 27.

Further, in a prior-art optical disk of the write-once type, pits are bored into a recording medium to record information as changes in physical shape. Since a servo signal and an information signal can be detected by the same manner, a reflection or transmission beam is not separated into two beams for generating a servo signal and an information signal when a reading operation. For instance, a sum signal (A+B+C+D) is generated from the outputs of the aforementioned servo signal detector, and the high-frequency region of this signal is used for reading the recorded information. Therefore, in the optical disk apparatus, the structure shown in FIGS. 1 and 2 permits detection of both the servo signal and the information signal with a single four-division photodetector.

However, since the magneto-optical reading system detects the information signal based on a manner described below, the above-described manner for detecting the information signal used in the write-once type cannot be adapted. Since the magneto-optical recording of information uses a thermomagnetic recording method, the information is recorded on a surface of a recording medium as magnetically changes but not as changes in physical shape. Accordingly, a magneto-optical effect, known as the Kerr effect or the Faraday effect, is used for reading the magnetically recorded information from the magneto-optical medium.

Figure 3:
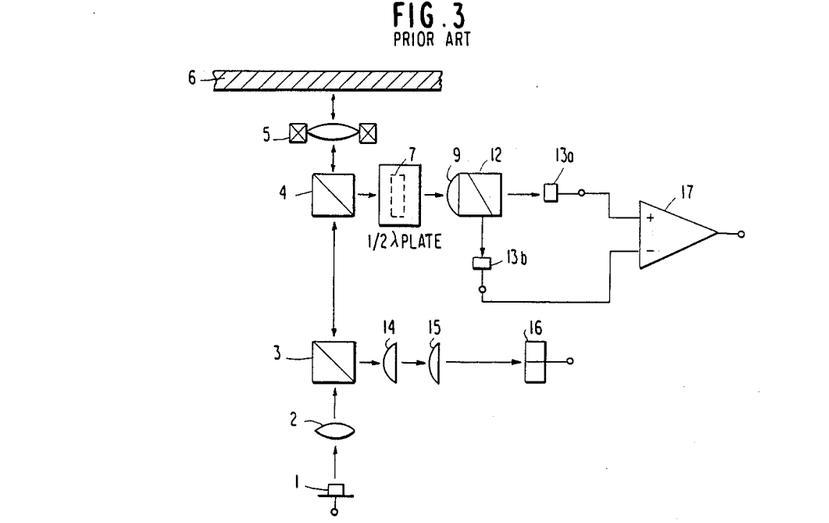
FIGS. 3 and 4 are side views illustrating a magneto-optical head of a prior art.

Referring now to FIG. 3, in a conventional magneto-optical head utilizing the Kerr effect, as is described in the Japanese Patent Disclosure No. 233,448/1986, a laser beam emitted from a semiconductor laser device 1 is collimated into a parallel beam by a collimator lens 2. The laser beam passes beam splitters 3 and 4, and is narrowed down into a fine spot beam by an objective lens 5. The fine spot beam is irradiated on a surface of a magneto-optical recording medium 6. When the fine spot beam reflects from the medium 6, polarization of the reflection beam varies with magnetization of the magneto-optical recording medium 6.

The reflection beam from the magneto-optical medium 6 again passes the objective lens 5. A direction of an optical-path of the reflection beam is deflected and changed by the beam splitter 4. Then, the reflection beam reaches a ½ wavelength plate 7 supported by a rotation mechanism. The ½ wavelength plate 7 rotates a plane of the polarization of the reflection beam by π/4 radian (45°) and sends the beam to a lens 9 and a photodetecting element 12. The reflection beam is condensed by a lens 9 into photodetectors 13a and 13b, which output signals corresponding to the magnetization of the medium 6 to enable a differential amplifier 17 to produce a difference signal.

The transmitted light from the beam splitter 4 is partly reflected by the beam splitter 3, and led to a servo system consisting of a cylindrical lens 14, a spherical lens 15 and a four-division photodetector 16. The servo system uses the aforementioned astigmatism method. The photodetector 16 produces the focus error and track error signals, which are used for determining the position of the light beam on the surface of the magneto-optical medium 6.

Figures 4, 5:
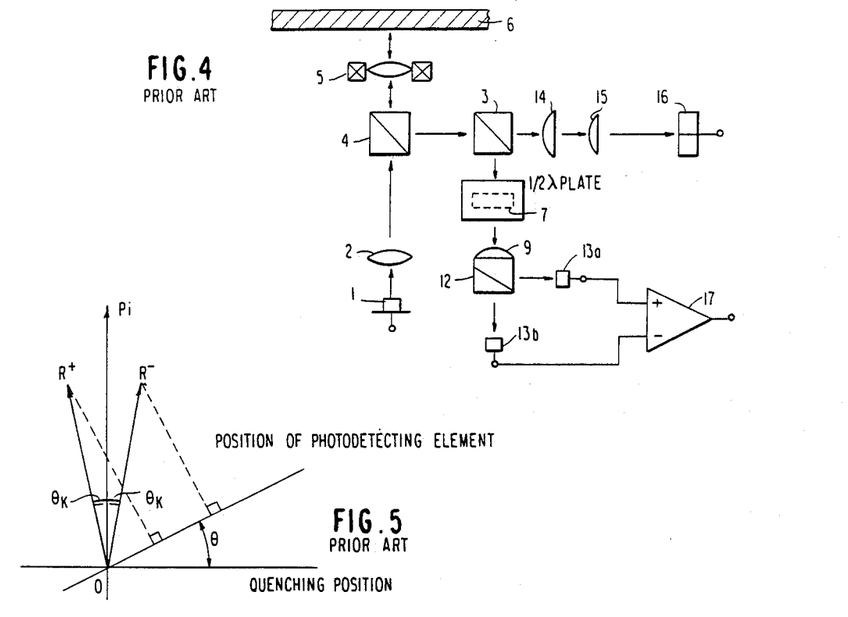
FIG. 5 is a diagram illustrating the principle of a magneto-optical reading operation utilizing the magnetic Kerr effect used in a prior art.

Another magnetic-optical head, illustrated in FIG. 4, is similar in structure to that shown in FIG. 3 except that the beam splitter 3 is positioned on the optical-path of the reflection beam deflected by the beam splitter 4.

FIG. 5 is a diagram illustrating the principle of magneto-optical reading operation utilizing the magnetic Kerr effect. In the drawing, Pi represents a polarized beam coming incident on the magneto-optical medium 6; R+, one reflected by a magnetized region of the medium 6, which is magnetized in one direction with respect to the thickness direction of the medium 6; R−, one reflected by a region of the medium 6, which is magnetized in the other direction; and $\theta_k$, which is known as the Kerr rotation angle, the quantity of rotation of the plane of the polarization resulting from the magneto-optical effect. In this case, when the reading light spot beam scans the alternately magnetized region of the magneto-optical recording medium 6, the intensity I' of the modulated light, with the photodetecting element 12 mechanically rotated by $\theta$ from the quenching position, is represented by the following equation, wherein P represents the intensity of the light coming incident on the photodetecting element 12.

$$I' = P \sin^2\theta_k \sin^2\theta$$

The recorded information signals are optically read by the photodetectors 13a and 13b in accordance with the above equation.

The magneto-optical head illustrated in FIG. 3 is inefficient in the utilization efficiency of the light beam because the two beam splitters 3 and 4 are inserted in the optical-path of the reflection and transmission beam, i.e., between the laser device 1 and the magneto-optical medium 6 to obtain the servo error signal and the information signal. On the other hand, in the magneto-optical head illustrated in FIG. 4, though only one beam splitter 4 is inserted between the laser device 1 and the medium 6, another beam splitter 3 is required between the beam splitter 4 and the photodetector 16. Therefore, the efficiency of light utilization is still inefficient so as to invite a deterioration in the signal-to-noise (SN) ratio of the recorded information signals.

Moreover, the magneto-optical heads shown in FIGS. 3 and 4 tend to have spatially large structures because the heads 3 and 4 use both the beams transmitted and reflected by the photodetecting element 12. It is necessary to adjust a pair of photodetectors 13a and 13b in optical characteristics. Furthermore, since the light receiving areas of the photodetectors 13a and 13b are small, individual adjustment of the light receiving position is required. As described above, the need for separate optical systems to obtain the servo error signal and the information signal necessitates a correspondingly larger structure, which means a major setback to reducing the size and cost of the magneto-optical head.

Figure 6:
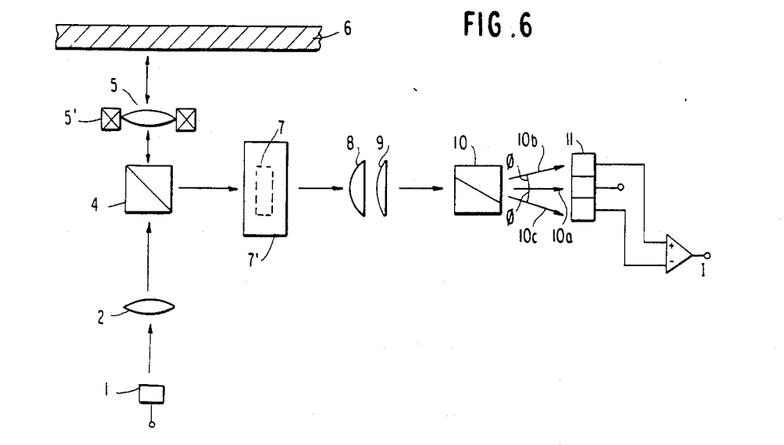
FIG. 6 is a side view of a first embodiment of the present invention.

Now, a first embodiment of the invention will be described with reference to FIG. 6.

The first embodiment of the invention comprises a semiconductor laser device 1 and a collimator lens 2 for condensing a laser beam emitted from the semiconductor laser device 1 and irradiating the surface of a magneto-optical recording medium 6 with the condenser beam. The magneto-optical head further has a beam splitter 4 and an objective lens 5. A ½ wavelength plate 7 is supported by a rotation mechanism 7' and rotate by $\pi/4$ radiam (45°) the plane of polarization of a reflection beam reflected from the recording medium 6 and changed its optical-path by the beam splitter 4. In the optical-path of the reflection beam, there is provided with a cylindrical lens 8, a spherical lens 9 and a multiplying element 10 for polarizing and dividing the reflection beam into a direction of a beam axis of the reflection beam and two different directions at a separating angle with respect to the beam axis of the reflection beam. A multi-division photodetector 11 is provided for detecting a information signal and a servo error signal from the devided three beams.

The laser beam emitted from the semiconductor laser device 1 is transmitted by the collimator lens 2 and the beam splitter 4 in that order, and condensed by the objective lens 5 provided on an actuator 5' to irradiate the surface of the magneto-optical recording medium 6. A part of the irradiated laser beam is reflected by the recording medium 6 so as to become the reflection beam. The reflection beam is divided by the beam splitter 4. The beam splitter 4 reflects a information signal component of the reflection beam by 100 percent and a part of the component whose plane of polarization is different from that of the information signal component by $\pi/2$ radian (90°). The reflection beam deviated by the beam splitter 4 is subjected to a rotation of $\pi/4$ radian of its plane of polarization by ½ wavelength plate 7. The ½ wavelength plate 7 is provided for inclining a polarizing direction of the reflection beam by 45° ($\pi/4$ rad.) with respect to a first optical axis of a crystal constituting the multiplying element (Wollaston prism) 10 which is explained in more detail later. Therefore the ½ wavelength plate 7 could be omitted if the inclination of the prism of the multiplying element (Wollaston prism) 10 is appropriately designed.

The reflection beam is transmitted by the cylindrical lens 8, whose axial line is inclined at a 45° relative to the track direction of the medium 6 and by the spherical lens 9. Next, the reflection beam is divided into a first beam 10a whose beam axis (beam center) is parallel to that of the reflection beam, and second and third beams 10b and 10c whose beam axes having a separating angle of $\phi$ to the beam axis of the reflection beam. The first, second and third beams 10a, 10b and 10c are led to the multi-division photodetector 11.

Figure 7:
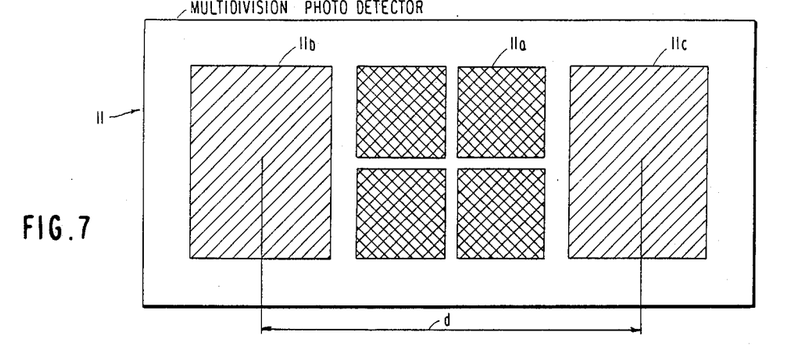
FIG. 7 is a plan view of a multi-division photodetector used in the first embodiment illustrated in FIG. 6.

Referring now to FIG. 7, the multi-division photodetector 11 is supplied with the first beam 10a to its four-division photodetecting section 11a, and outputs the focus error and track error signals by the astigmatism method described with reference to FIG. 2. The second and third beams 10b and 10c are led to photodetecting sections 11b and 11c of the multi-division photodetector 11, in order to obtain an information signal I recorded on the medium surface by subjecting signals received by photodetecting sections 11b and 11c to differential operation.

In order to achieve the differential operation of the signals from the photodetecting sections 11b and 11c, the multi-division photodetector 11 has to bring equal intencities of light to incidence on the two photodetecting sections 11b and 11c in their initial state. To this end, there is provided the rotation mechanism 7' for adjusting the ½ wavelength plate 7 by rotating it around the beam axis of the reflection beam. Meanwhile, if the optical axis of the ½ wavelength plate 7 is so designed as to rotate the plane of the reflection beam polarization by $\pi/4$ radian in advance, no rotation mechanism will be required. However, for practical purposes, since there may be a mechanical dislocation or environmental conditions may invite a change in the optical characteristic, it is advisable to provide the rotation mechanism 7'.

Figure 8A:
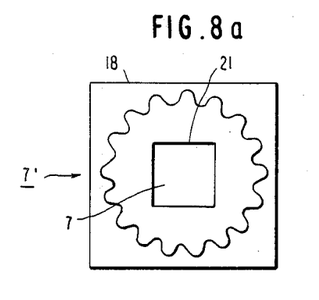
FIGS. 8(a) and 8(b) are a front view and a side view, respectively, of a mechanism for rotating a ½ wavelength plate used in the first embodiment illustrated in FIG. 6.
Figure 8B:
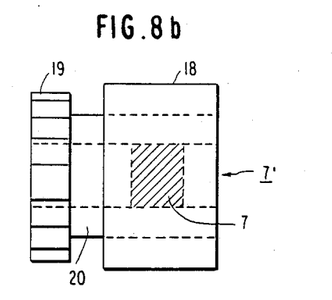

Referring to FIGS. 8(a) and 8(b), the rotation mechanism 7' of the ½ wavelength plate 7 has a supporting base 18 which supports a rotatable supporting pillar 20. To one end of the supporting pillar 20 is fixed a gear 19, and a through hole 21 penetrates the supporting pillar 20 and the gear 19. In this through hole 21 is fixed the ½ wavelength plate 7. This arrangement lets the ½ wavelength 7 be rotated by the turning of the gear 19.

Figure 9:
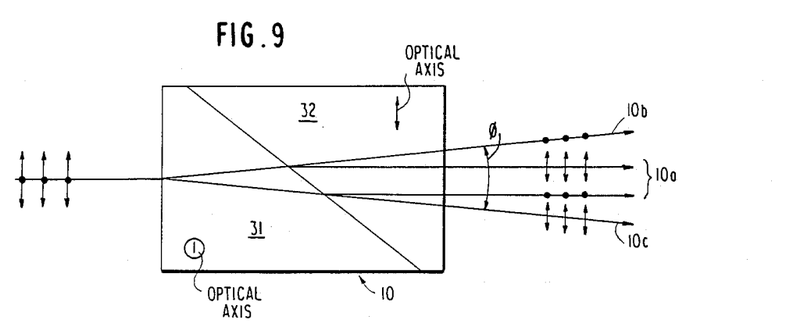
FIG. 9 and FIGS. 10(a) to 10(h) are a side view and vector diagrams, respectively, for explaining the optical properties of a multiplying element used in the first embodiment illustrated in FIG. 6.

FIG. 9 illustrates the optical properties of the multiplying element (Wollaston prism) 10. The Wollaston prism 10 includes a first prism 31 consisting of a monoaxial crystal, such as quartz, whose optical axis is orthogonal to the beam center axis of a transmitted light (the reflection beam) and is in a direction inclined by approximately 45° to the polarizing direction of the transmitted light. The Wollaston prism 10 further includes a second prism 32 which consists of the same material as the first prism 31 and whose optical axis deviates from that of the prism 31 by a certain degree to be stated below and is in a direction orthogonal to the beam axis of the transmitted light. The prisms 31 and 32 are ground into the same wedge shape, and are adhered to each other.

In the prior art, a prism whose optical axis is parallel to the plane of an incidence and another whose optical axis is vertical to the same are stuck together to form a Wollaston prism or a doubling element, whose apical angle determines the separating angle $\phi$. For the multiplying element pertaining to this embodiment, the optical axis of the prism 31 on the incident light side is set at any desired angle as illustrated; the luminous flux is bisected by utilizing the birefringent property of quartz; each split flux is again divided according to the apical angle into the corresponding difference. Each split flux is transmitted by the next prism 32 to emit a luminous flux. Here, four fluxes are basically formed, but it is possible to divide the original flux into virtually three directions by so setting the optical axis and the apical angle of the prism that two of the split fluxes overlap each other.

The beam transmitted by the multiplication element (Wollaston prism) 10 is separated into the second and third beams 10b and 10c whose intensities change with the polarization of the incident light (the reflection beam), and the first beam 10a whose intensity does not change. Among these beams, since the first beam 10a, whose intensity does not change with the polarization, is unaffected by magneto-optical information recorded on the recording medium 6, it can be used for detecting changes in the reflection factor of the recording medium 6 (or for reading the information recorded in the write-once type optical disk), i.e., it can be used for detecting the servo error signal, such as the focas error and tracking error signals.

As the second and third beams 10b and 10c, whose intensities vary with the polarization, vary in intensity in reverse phase to each other with the condition of polarization (inclination of polarization) of the reflection beam from the recording medium 6, the information magneto-optically recorded on the recording medium 6 can be detected by receiving the second and third beams 10b and 10c separately with photodetecting elements 11b and 11c, respectively, by determining the difference between their outputs.

The luminous energy ratio of the first, second and third beams can be determined by, for instance, setting the optical axis of the second prism 32 (on the emitting side) at any desired angle. The separating angle $\phi$ is eventually determined by the apical angle of the prisms 31 and 32. Therefore, the separating width d of the multi-division photodetector 11 is set in advance to be identical with the separating width calculated from the separating angle $\phi$.

Detection of signals is theoretically possible irrespective of the intensity ratio among the first, second and third beams separated by the multiplying element 10. However, since variations in the polarization of the reflection or transmission beam are infinitesimal, the intensities of the second and third beams 10b and 10c used for detecting changes in the condition of polarization should desirably be greater than that of the first beam 10a used for detecting the servo error signal in order that the information be detected with high reliability. For this reason, this embodiment is so designed that the sum of the intensities of the second and third beams 10b and 10c can be made greater than that of the first beam 10a by adjusting the inclinations of the optical axes of the first and second prisms 31 and 32 constituting the multiplying element 10.

Now will be described, with reference to FIGS. 10(a) to 10(h), how the characteristic of the multiplying element 10 is adjusted to meet the above requirement. FIGS. 10(a) to 10(h) schematically show how the reflection beam from the medium 6 having a linear polarization characteristic is separated by the multiplying element 10.

Figure 10A:
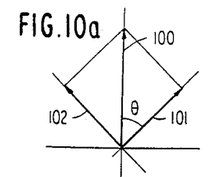

FIG. 10(a) illustrated how a linearly polarized reflected light 100, coming incident on the multiplying element 10, is separated by the prism 31 into an ordinary light 101 and an extraordinary light 102. The prism 31, with its optical axis in the direction shown in FIG. 10(g), gives the light 101 polarized in the direction orthogonal to the optical axis as the ordinary light and the light 102 polarized in the direction parallel to the optical axis as the extraordinary light. Here, the angle formed by the polarizing direction of the light 100 coming incident on the prism 31 and that of the ordinary light 101 being represented by $\theta$ and the amplitude of the incident light being supposed to be 1, the amplitude of the ordinary light 101 is $\cos\theta$ and that of the extraordinary light 102 is $\sin\theta$.

Figure 10B:
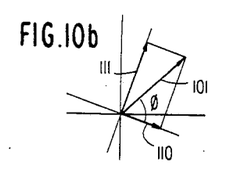
Figure 10C:
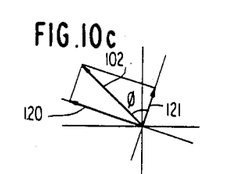
Figure 10D:
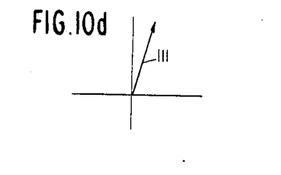
Figure 10E:
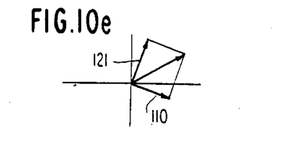
Figure 10F:
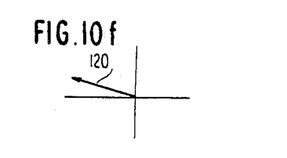
Figure 10G:
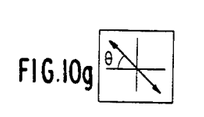
Figure 10H:
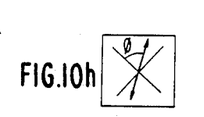

FIG. 10(b) shows how the ordinary light 101 in the prism 31 is further separated by the prism 32 into an ordinarly light and an extraordinary light. As the optical axis of the prism 32 is in a direction inclined by $\phi$ from that of the prism 31 as shown in FIG. 10(h), both the ordinary light 101 and the extraordinary light 102 in the prism 31 are also separated into ordinary and extraordinary lights in the prism 32. The amplitude of the ordinary light 101 of the prism 31 being represented by $\cos\theta$, those of the ordinary light 110 and the extraordinary light 111 to be separated therefrom in the prism 32 are $\cos\theta.\cos\phi$ and $\cos\theta.\sin\phi$, respectively. The extraordinary light 102 in the prism 31, as shown in FIG. 10(c), is also separated in the prism 32 into an ordinary light 120 and an extraordinary light 121, whose amplitudes are $\sin\theta.\sin\phi$ and $\sin\theta.\cos\phi$, respectively.

The ordinary and extraordinary lights differ from each other in refractive index in the prisms 31 and 32. Therefore, the light that is made an ordinary light in the prism 31 and an extraordinary light in the prism 32 or, conversely, what is made an extraordinary light in the prism 31 and an ordinary light in the prism 32, is bent in the optical path on the boundary of the prisms 31 and 32. On the other hand, what maintains a state of ordinary light or extraordinary light through both prisms 31 and 32 proceeds straight ahead without being bent in the optical path on the boundary of the prisms. The light 111, which is made an ordinary light in the prism 31 and an extraordinary light in the prism 32, has the amplitude and the polarization shown in FIG. 10(d). The light 111 turns into, for instance, the beam 10b shown in FIG. 9, bent upward in the multiplying element 10. The light 120, which is made an extraordinary light in the prism 31 and an ordinary light in the prism 32, has the amplitude and the polarization shown in FIG. 10(f). The light 120 turns into, for instance, the beam 10c shown in FIG. 9, bent downward. The light 110, which is made an ordinary light in both prisms 31 and 32, and the light 121, which is made an extraordinary light in both prisms 31 and 32, have the amplitudes and the polarizations respectively shown in FIG. 10(e). The lights 110 and 121 proceed straight ahead through the multiplying element 10 to turn into the central beam 10a shown in FIG. 9.

As the intensity of each beam is figured out by squaring said amplitude, that of the beam 111 is $\cos^2\theta \sin^2\phi$, and that of the beam 120 is $\sin^2\theta \sin^2\phi$, that of the light 100 incident on the multiplying element 10 being represented by 1. That of the straight-proceeding beam, resulting from the synthesis of the two beams 121 and 110, is the sum of their intensities, i.e. $\cos^2\theta \cos^2\phi + \sin^2\theta \cos^2\phi = \cos^2\phi$. Accordingly, the intensity ratio among the first, second and third beams separated by the multiplying element 10 is represented as follows:

$$\cos^2\theta \sin^2\phi : \cos^2\phi : \sin^2\theta \sin^2\phi (=10a:10b:10c)$$

which is on the basis of the angle $\theta$ formed by the ordinary light polarizing direction of the prism 31, constituting a part of the multiplying element 10, and the polarizing direction of the light incident on the prism and the difference $\phi$ between the inclinations of the main axes of the prisms 31 and 32.

Since a change in the polarization of the light incident on the multiplying element 10 means a variation in the value of $\theta$ in the above formula, the light intensities varying with $\theta$ are affected by the condition of polarization, but that of the central beam proceeding straight ahead is $\cos^2\phi$, having no component subject to $\theta$. Accordingly the light intensities does not vary with the condition of polarization. Meanwhile, as the intensities of the second and third beams 10b and 10c vary in proportion to $\cos^2\theta$ and $\sin^2\theta$, they vary with changes in polarization in reverse phase to each other.

Since the intensities of the second and third beams 10b and 10c are $\cos^2\theta \sin^2\phi$ and $\sin^2\theta \sin^2\phi$, respectively, their sum is $$\cos^2\theta \sin^2\phi + \sin^2\theta \sin^2\phi = \sin^2\phi$$

so that this combined intensity can be made greater than the intensity of the first beam 10a, which is unaffected by polarization, by making $\sin^2\phi \geq \cos^2\phi$ (i.e. $45° \leq |\phi| \leq 135°$)

However, as $\cos^2\phi$ is close to 0 in the neighborhood of $|\phi|=90°$, the intensity of the first beam 10a, which is unaffected by polarization, will become extremely small there, with the result that the first, second and third beams 10a, 10b and 10c will be practically unavailable. Further, in order to detect magneto-optical variations from the intensity difference between the second and third beams 10b and 10c, the intensities of the second and third beams 10b and 10c beams should desirably be substantially equal in a balanced state, and to achieve such a state it is desirable to set $\sin^2\theta = \cos^2\phi$, i.e. $|\theta|$, in the vicinity of 45°.

As hitherto described, such a structure can be realized as will let the three beams 10a, 10b and 10c, having a desired ratio of light intensities, be emitted by appropriately ajusting the optical axis directions of the two prisms 31 and 32 constituting the multiplying element 10.

Figure 11:
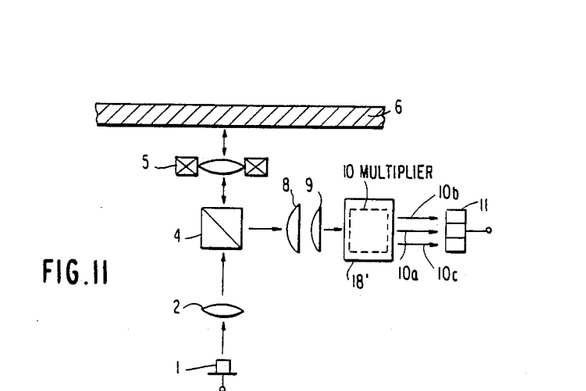
FIG. 11 is a side view of a second embodiment of the present invention.

Referring now to FIG. 11, in a second embodiment of the invention, similar to the first embodiment, a semiconductor laser device 1 is used as light source, a laser beam emitted from which is condensed to irradiate a magneto-optical recording medium 6, and a beam splitter 4 is arranged on the optical-path of a reflection beam from the medium 6 to divide the amplitude of the reflection beam. On the optical-path of the reflection beam from the medium 6 are also arranged a cylindrical lens 8, a spherical lens 9 and a multiplying element 10 for polarizing and dividing the reflection beam into first, second and third beams 10a, 10b and 10c, one in the direction of the beam axis of the reflection beam and two others deviating from the beam axis by a separating angle. The multiplying element 10 is supported by a rotation mechanism 18′, which is similar to the mechanism illustrated in FIG. 8. A multi-division photodetector 11 detects a servo signal and an information signal from the first, second and third beams 10a, 10b and 10c.

In the foregoing first embodiment, the multiplying element 10 is arranged in a fixed state, and the plane of polarization is rotated by $\pi/4$ radian with the ½ wavelength plate 7 to equalize the luminous energies of the lights resulting from polarization and division by the multiplication element 10 at the separating angle of $\phi$. In the second embodiment, in contrast, the ½ wavelength plate 7 is omitted, and instead the multiplication element 10 itself is arranged on the rotation mechanism 18 to achieve the same effect by rotating it around the optical axis. Since the directions of the first, second and third beams 10a, 10b′ and 10c are changed by the rotation of the multiplying element 10, the structure is designed as to enable each of the beams 10a, 10b and 10c always stably reach the photodetecting sections 11a, 11b and 11c by fixing the photodetector 11 with respect to the multiplying element 10.

Although the foregoing embodiments are examples of basic magneto-optical systems, the structure may includes a phase compensating plate having an effect to phase-compensate the influence of the retardation, which may occur in optical elements or the photomagnetic recording medium. In these embodiments, the reflection beam from the magneto-optical recording medium is divided with a beam splitter, and the servo and the information signals are obtained by the use of the reflected beam from the beam splitter. However, the optical structure of the beam splitter may be altered to use the transmitted light for the signal detection. In this case, the laser beam from the light source would be reflected by the beam splitter to be condensed on the magneto-optical recording medium. Though the foregoing embodiments are so structured as to detect information signals by the use of the reflection beam from the recording medium, the structure may be modified to use the a transmission beam transmitted through the magneto-optical recording medium for signal detection. Incidentally, the transmission factor of the beam splitter and focus error detecting means using the astigmatism method in these embodiments need not be limited to these structures, but obviously any other structure giving a similar effect would be applicable.

As hitherto described, the magneto-optical head according to the present invention can obtain both the information signal and the servo error signal with a single multi-division photodetector by the use of a multiplying element, resulting in a smaller and lighter optical system. The integration of the optical system for obtaining the servo error signal and the information signal also contributes to improving the utilizing efficiency of light energy from the light source. This enables to reduce the load on the light source and eventually to increase the data transfer speed by rotating the disk faster. Furthermore, it is also made possible to substantially reduce the access time of the magneto-optical recording system itself. Meanwhile, the use of only one photodetector can result in significant simplification of adjustment.

What is claimed is:

1. A magneto-optical head comprising:
    a light source for generating a beam;
    a first optical system for focusing said beam on a surface of a magneto-optical recording medium;
    a beam splitter located on a first optical-path of a reflection or transmission beam reflected or transmitted from said magneto-optical recording medium for changing a direction of said first optical-path so as to form a second optical-path;
    a second optical system located on said second optical-path for dividing said reflection or transmission beam into a first beam having a first beam axis directed substantially parallel to said second optical path, and second and third beams having second and third beam axes, respectively, said second and third beam axes having a predetermined separating angle with respect to said second optical path; and
    a multi-division photodetector means for detecting a servo signal and an information signal from said first, second and third beams.

2. The magneto-optical head as claimed in claim 1, herein said second optical system comprises: a ½ wavelength plate for rotating the plane of polarization of said reflection or transmission beam by $\pi/4$ radian; a cylindrical lens and a spherical lens for use in the detection of focus error by the astigmatism method; and a multiplying element for dividing said reflection or transmission beam into said first, second and third beams by modifying the polarization of said reflection or transmission beam.

3. The magneto-optical head as claimed in claim 2, wherein said multiplying element comprises a first prism and a second prism, each of said prisms having an optical axis that is orthogonal to the first beam axis, said optical axes of said first and second prisms being separated by an angle within a range of from 45° to 135°.

4. The magneto-optical head as claimed in claim 1, wherein said second optical system includes: a cylindrical lens and a spherical lens for use in the detection of focus errors by the astigmatism method, a multiplying element for dividing said reflection or transmission beam into said first, second and third beams by modifying the polarization of said reflection or transmission beam; and a mechanism for adjusting the relative intensities of second and third beams by rotating said multiplying element.

5. The magneto-optical head as claimed in claim 4, wherein said multiplying element includes a first prism having a first optical axis inclined by approximately 45° with respect to a polarization direction of said reflection or transmission beam in said second optical-path and a second prism having a second optical axis inclined by an angle within a range of from 45° to 135° with respect to said first optical axis.

6. The magneto-optical head, as claimed in claim 1, wherein said multi-division photodetector detects said servo error signal from said first beam and said information signal from said second and third beams.

7. The magneto-optical head as claimed in claim 1, wherein said light source is a photoconductive laser device.

8. The magneto optical head of claim 6 wherein said multi-division photodetector comprises a first part for detecting said servo error signal and a second part for detecting said information signal, said second part comprising a first element for detecting said second beam and second element for detecting said third beam, said information signal being obtained from said first and second elements.

9. The magneto optical head of claim 8 wherein the sum of the light intensities of said second and third beams is greater than the light intensity of said first beam.

10. The magneto-optical head of claim 2 wherein said ½ wavelength plate is mechanically adjustable.

11. The magneto-optical head of claim 2 wherein said second optical system comprises a cylindrical lens and a spherical lens for use in the detection of focus error by the astigmatism method and a multiplying element for dividing said reflection or transmission beam into said first, second and third beam by modifying the polarization of said reflected or transmitted beam.

12. The magneto optical head of claim 11 wherein said multiplying element is rotatable about the optical axis of the reflection or transmission beam and thereby adjusts the relative energy of the first, second and third beams.

13. The magneto optical head of claim 11 wherein said multiplying element and said photodetector are mechanically fixed relative to each other such that the three beams always reach the photodetector at each of a plurality of rotational positions of said element.

14. A magneto-optical head for irradiating a recording medium on which information is magneto-optically recorded with a focused beam and for detecting magneto-optically recorded information according to variations in polarization of a reflection or transmission beam reflected from or transmitted by said recording medium, comprising: a multiplying element arranged on an optical-path of said reflection or transmission beam for separating said reflection or transmission beam into first and second beams whose intensities vary with their conditions of polarization and a third beam whose intensity is unaffected by polarization, said multiplying element making the sum of light intensities of said first and second beams greater than a light intensity of said third beam; and a photodetector means including photodetecting elements separately receiving said first, second and third beams after passing through said multiplying element and arranged on the same plane for detecting magneto-optical changes on said recording medium according to an intensity difference between said first and second beams and detecting variations in a reflection factor of said recording medium and an error signal for servo control according to said third beam.

* * * * *

UNITED STATES PATENT AND TRADEMARK OFFICE
CERTIFICATE OF CORRECTION

PATENT NO. : 4,951,274

DATED : 8/21/90

INVENTOR(S) : IWANAGA, ET AL

It is certified that error appears in the above-identified patent and that said Letters Patent is hereby corrected as shown below:

Column 1, line 27, delete "analysing", insert --analyzing--;

Column 2, line 49, delete "Verious", insert --Various--;

Column 6, line 61, delete "focas", insert --focus--;

Column 9, line 48, delete "18", insert --18'--;

line 50, delete "10b'", insert --10b--.

Signed and Sealed this

Twenty-first Day of April, 1992

Attest:

HARRY F. MANBECK, JR.

*Attesting Officer*  *Commissioner of Patents and Trademarks*